(12) United States Patent
Preston

(10) Patent No.: US 8,645,525 B2
(45) Date of Patent: Feb. 4, 2014

(54) USING PRIME NUMBERS TO MANAGE PARTITIONING IN A CLUSTER OF NODES OF COMPUTERS

(75) Inventor: Adrian James Preston, Southampton (GB)

(73) Assignee: International Business Machines Corporation, Armonk, NY (US)

(*) Notice: Subject to any disclaimer, the term of this patent is extended or adjusted under 35 U.S.C. 154(b) by 975 days.

(21) Appl. No.: 11/936,809

(22) Filed: Nov. 8, 2007

(65) Prior Publication Data

US 2008/0301287 A1 Dec. 4, 2008

(30) Foreign Application Priority Data

Nov. 11, 2006 (GB) .................................. 0622553.6

(51) Int. Cl.
*G06F 15/173* (2006.01)
(52) U.S. Cl.
USPC .......................................... 709/224; 709/221

(58) Field of Classification Search
USPC ................................................. 709/224, 221
See application file for complete search history.

(56) References Cited

U.S. PATENT DOCUMENTS

| 5,999,712 A | 12/1999 | Moiin et al. | |
| 6,192,401 B1* | 2/2001 | Modiri et al. | 709/220 |
| 7,142,668 B1* | 11/2006 | Kogure | 380/28 |
| 2003/0120931 A1* | 6/2003 | Hopkins et al. | 713/180 |
| 2007/0033205 A1* | 2/2007 | Pradhan | 707/100 |
| 2008/0005208 A1* | 1/2008 | Vaswani et al. | 707/206 |

* cited by examiner

*Primary Examiner* — Phuoc Nguyen
*Assistant Examiner* — Steven Nguyen
(74) *Attorney, Agent, or Firm* — Lee Law, PLLC; Christopher B. Lee

(57) ABSTRACT

For managing partitioning in a cluster of nodes, each node is assigned a prime number for use in determining which partition should be activated following partitioning of the cluster. The cluster is monitored for partitioning. If partitioning is detected, a partition value is calculated from the product of the prime numbers assigned to each node in each partition. A node is activated only if it is within the partition having the greatest partition value.

18 Claims, 4 Drawing Sheets

| NODE ID | ASSIGNED PRIME NUMBER |
|---------|----------------------|
| A | 2 |
| B | 3 |
| C | 5 |
| D | 7 |

FIG. 2

USING PRIME NUMBERS TO MANAGE PARTITIONING IN A CLUSTER OF NODES OF COMPUTERS

FIELD OF THE INVENTION

The present invention relates to a method, apparatus, and software program product for managing partitioning in a cluster of nodes.

BACKGROUND

In computing architecture, a cluster is a term used for a set of interconnected nodes such as computers. A cluster is arranged to provide facilities such as balancing the load of processing many simultaneous computational tasks, high availability of resources such as data or application programs or parallel processing. High availability (HA) clusters are arranged to ensure the availability of the services provided by the cluster and may be implemented with redundant nodes that normally remain inactive. These inactive nodes are then used to provide the cluster services in place of any failed active nodes. The cluster management system for a given cluster is arranged to use the inherent redundancy in the cluster to eliminate single point failures.

One problem that must be managed for clusters is partitioning. Partitioning occurs when one or more nodes fail or the communication links between nodes fail. This can result in the cluster being effectively divided into two separate sub-clusters or partitions. If not properly managed, cluster partitions might compete for the cluster resources such as communication or data resources, which may result in data corruption or service degradation. Thus, when partitioning is detected, each cluster partition is arranged to identify whether or not it should provide the cluster's services or should shut down in favor of another partition.

One method for determining which partition should survive such reorganization is a quorum system in which a single partition is selected to provide the cluster's services. In some quorum systems, nodes are assigned different weights and the product of the node weights for each partition is used to determine which partition provides the cluster's services. One problem with such quorum systems is that partitions may occur with equal numbers of nodes or products of node weights. In this situation unless an additional management system is provided to deal with such a tie-break situation the cluster partitions may compete with each other, resulting in data corruption or service degradation. The additional management system increases the time taken to reorganize the cluster and the processing burden on each node.

SUMMARY

One embodiment of the invention provides a method for managing partitioning in a cluster of nodes, the method comprising the steps of:
a) assigning a prime number for a node in a cluster of nodes;
b) monitoring the cluster for partitioning of the cluster;
c) if partitioning of the cluster is detected then calculating a partition value from the product of the prime numbers assigned to each node in each partition; and
d) if the node is within the partition having the greatest partition value then enabling the node to be active within the partition.

The node may maintain a record of all of the prime numbers assigned to each node in the cluster. The node may transmit a unique identifier and the assigned prime number to all other nodes in the cluster. If the node is within the partition not having the greatest partition value then the node may deactivate. The method may comprise the further steps of: calculating the number of nodes in each partition and enabling the node to remain active if the node is with the partition comprising the largest number of nodes and if more than one partition has the largest number of nodes then using the partition value to determine whether the node is enabled to remain active.

Higher prime numbers may be assigned to one or more particular nodes so as to increase the probability of the particular nodes being in the active partition. The prime numbers may be randomly selected from a range of prime numbers. A plurality of ranges of prime numbers may be provided, each for assignment to different categories of nodes. The number of bits used to represent the prime numbers may be moderated within a predetermined limit. The prime number for a new node to the cluster may be selected as the lowest prime number not assigned to any other node in the cluster.

Another embodiment provides apparatus for managing partitioning in a cluster of nodes, the apparatus being operable to:
a) assign a prime number for a node in a cluster of nodes;
b) monitor the cluster for partitioning of the cluster;
c) calculate, if partitioning of the cluster is detected, a partition value from the product of the prime numbers assigned to each node in each partition; and
d) enable the node to be active within the partition if the node is within the partition having the greatest partition value.

A further embodiment provides a program product or a group of programs arranged to enable a programmable device or a group of such devices to carry out a method for managing partitioning in a cluster of nodes, the method comprising the steps of:
a) assigning a prime number for a node in a cluster of nodes;
b) monitoring the cluster for partitioning of the cluster;
c) if partitioning of the cluster is detected then calculating a partition value from the product of the prime numbers assigned to each node in each partition; and
d) if the node is within the partition having the greatest partition value then enabling the node to be active within the partition.

Another embodiment provides a program product or a group of programs arranged to enable a programmable device or a group of such devices to provide apparatus for managing partitioning in a cluster of nodes, the apparatus being operable to:
a) assign a prime number for a node in a cluster of nodes;
b) monitor the cluster for partitioning of the cluster;
c) calculate, if partitioning of the cluster is detected, a partition value from the product of the prime numbers assigned to each node in each partition; and
d) enable the node to be active within the partition if the node is within the partition having the greatest partition value.

BRIEF DESCRIPTION OF THE DRAWINGS

Embodiments of the invention will now be described, by way of example only, with reference to the accompanying drawings in which:
FIG. 2 is a table illustrating data used in the cluster of FIG. 1;

DETAILED DESCRIPTION

Figure 1:
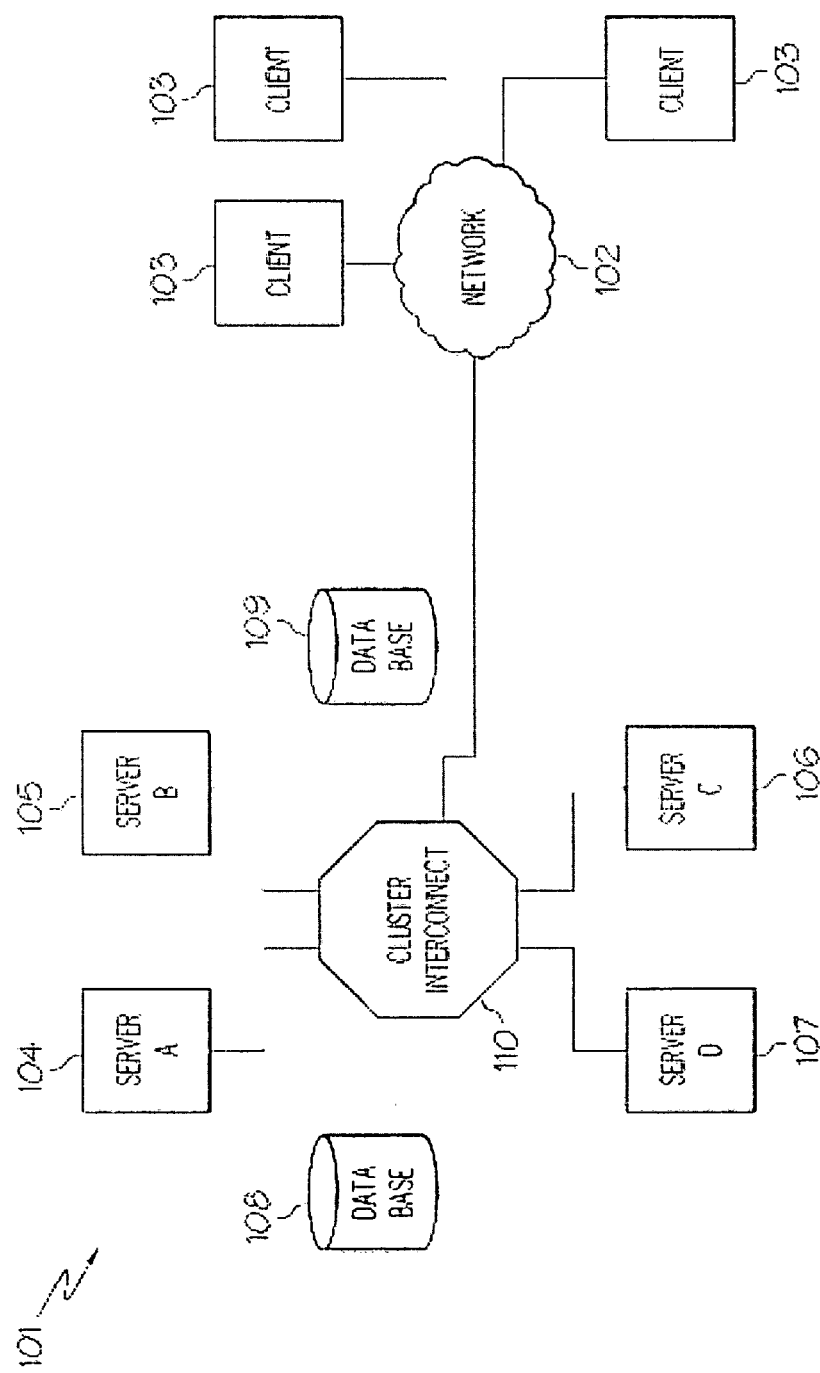
FIG. 1 is a schematic illustration of a computer network comprising a cluster.

With reference to FIG. 1, a computer cluster in the form of a high availability cluster 101 is connected, via a network 102, to client computers 103. The cluster 101 comprises four nodes in the form of server computers 104, 105, 106, 107 and two databases 108, 109. The cluster 101 elements are interconnected by a cluster interconnect 110 which also provides the connection between the cluster 101 and the network 102. The cluster is arranged to provide database services to the client computers 103. The server computers 104, 105, 106, 107 run database application programs, which utilize the two databases 108, 109 for storing their associated data. Each of the server computers 104, 105, 106, 107 is assigned a unique identifier, in the form of a media access control (MAC) address represented for clarity in FIG. 1 by the respective letters A, B, C and D.

In addition, to running the database application program, each server computer 104, 105, 106, 107 runs a cluster management program arranged to enable each node 104, 105, 106, 107 to perform appropriately within the cluster 101. One of the functions of the cluster management program enables the cluster to spontaneously reorganize itself in the event of a node or communication link failure that results in the partitioning of the cluster 101. The cluster reorganization ensures that there is minimal interruption of the database service provided by the cluster 101 to the client computers 103.

Figure 2:
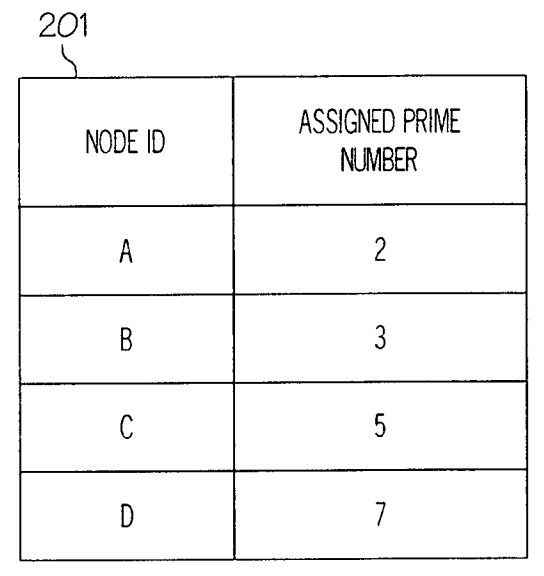

In the present embodiment, each node of the nodes 104, 105, 106, 107 is assigned a prime number that is unique to a given node. Each node is also equipped with a look up table (LUT) 201, as shown in FIG. 2, in which to store the MAC address of all the nodes 104, 105, 106, 107 and their associated prime numbers. As new nodes join the cluster 101, they are automatically assigned an unused prime number by their cluster management program. The MAC address of the a new node and its associated prime number are transmitted to each existing node in the cluster to enable the update of their respective LUTs 201. The new node is included in the cluster with a fully updated LUT 201.

In the event of a failure being detected by any one of the nodes 104, 105, 106, 107, a partition message is broadcast to all nodes in the cluster 101 by the cluster management program of the failure detecting node. In response a partition message, each node 104, 105, 106, 107 is arranged to identify all of the other nodes within its partition and then to use its LUT 201 to calculate the product x of the prime numbers assigned to each of those nodes. Each node then calculates the product y of the prime numbers assigned to each node not in its partition. If the product x is greater than the product y, then the node is within the active partition that will provide the cluster services post failure. The cluster management program in each node in the active partition is arranged to cooperate with the other nodes within the partition to provide the cluster services. If the product x is less than the product y, then the node is within the inactive partition and each such node stops providing any cluster services. In this manner, the co-operating cluster management programs avoid the possibility in a partitioning event of two partitions being formed with equal criteria for qualifying as the active partition, since no two partitions can have the same product of their respective assigned prime numbers. The fact that the product of two sets of prime number can never have the same value is based on the Fundamental Theorem of Arithmetic otherwise known as the Unique Factorization Theorem.

Figure 3:
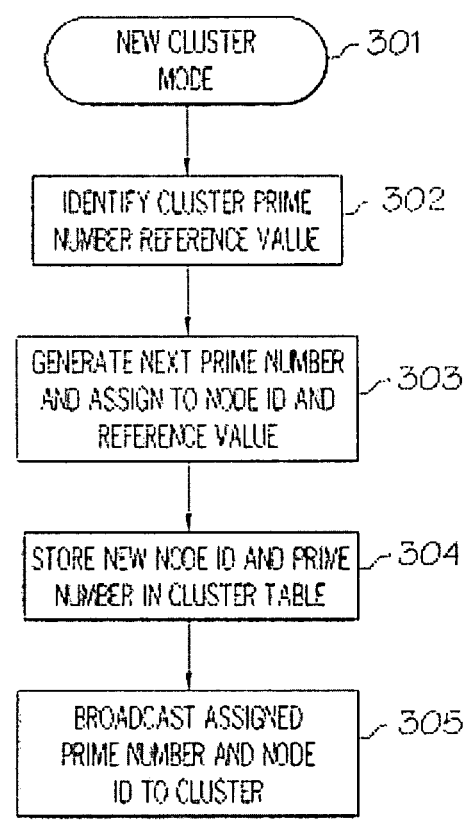
FIG. 3 is a flow chart illustrating processing carried out when adding a new node to the cluster of FIG. 1.

The processing carried out by a node joining the cluster 101 will now be described in further detail with reference to the flow chart of FIG. 3. At step 301, the cluster management program of a new node connected to the cluster interconnect 110 begins processing. At step 302, the new node accesses the LUT 201 of one or more of the existing nodes in the cluster. This enables the new node to identify the last assigned prime numbers in the cluster and to populate its own LUT 201 with the MAC address and assigned prime numbers for the existing nodes in the cluster. Processing then moves to step 303 where the next lowest unused prime number is determined and processing moves to step 304. At step 304, the prime number assigned to the new node is stored in the LUT 201 for the new node. Processing then moves to step 305 where the new node broadcasts its MAC address and assigned prime number to all of the existing nodes in the network thus enabling each of those nodes to update their respective LUTs with the detail of the new node. The cluster then continues providing its services as normal using the resources of the new node when necessary.

Figure 4:
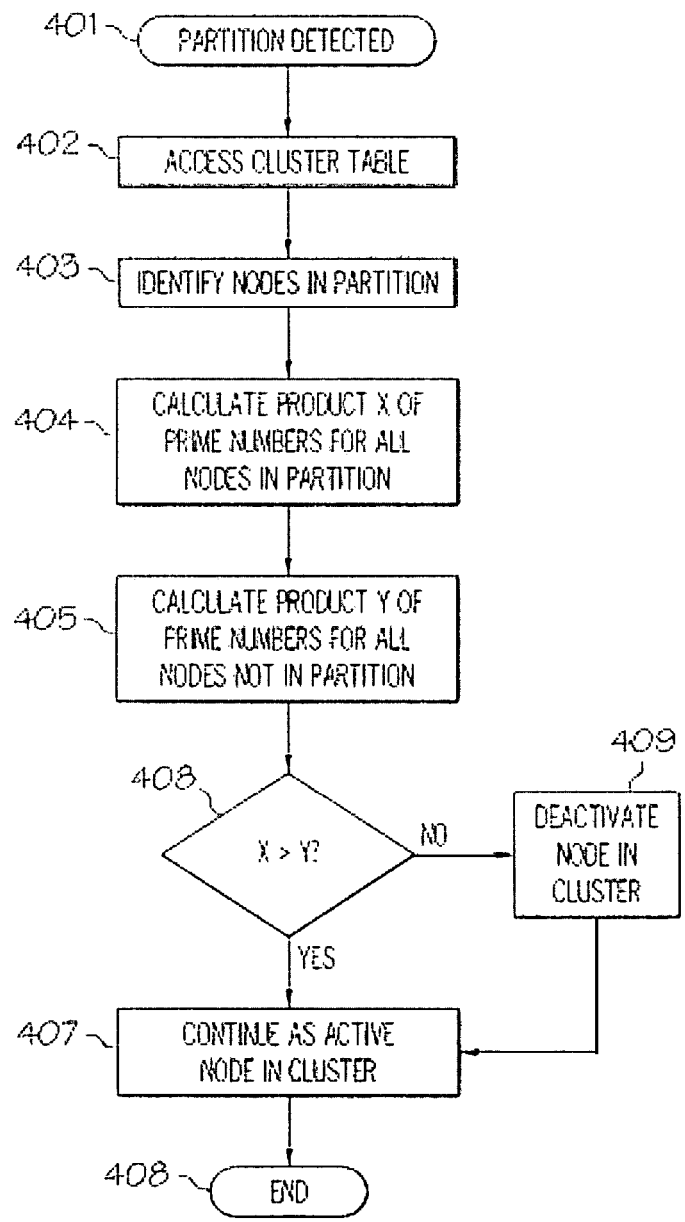
FIG. 4 is a flow chart illustrating processing carried out when partitioning is detected in the cluster of FIG. 1.

The processing carried out by any node in the cluster 101 when partitioning is detected will now be described further with reference to the flow chart of FIG. 4. At step 401, the current node is alerted to the fact that the cluster 101 has become partitioned. The node is alerted either by detecting the partitioning itself or by a partition notification message from another node. Processing then moves to step 402 where the LUT is accessed. At step 403, the node determines which other nodes are in the same partition and processing moves to step 404. At step 404, the product x of the prime numbers assigned to each node identified as being in the current partition is calculated from the entries in the LUT. Processing then moves to step 405 where the product y of the prime numbers assigned to each node not identified as being in the current partition is calculated from the remaining entries in the LUT.

Processing then moves to step 406 where the products x and y are compared and if x is greater than y processing moves to step 407. At step 407, the node is designated as a node that remains active, that is, a node in the active sub-cluster or partition. This active partition then proceeds to resume the provision of services of the cluster 101. If at step 406, x is less than y processing moves to step 409 where the node is designated as an inactive node and shuts down along with all the other nodes in its partition.

Once partitioning occurs, the active sub-cluster will continue to provide the cluster services until the fault that caused the partitioning is rectified and the full cluster reinstated or until a further partitioning of the active sub-cluster occurs.

In another embodiment, the active partition is normally selected as the sub-cluster having the largest number of nodes. Only when two partitions with the same largest number of nodes occur are the products of the assigned prime numbers used to decide which of the partitions should be selected as the active partition.

In a further embodiment, the prime numbers are selected from a predetermined range of such numbers. In another embodiment the prime numbers are randomly selected from a range of such numbers. In a further embodiment, higher prime numbers are assigned to more particular nodes thus making it more likely that those nodes are within the active partition after a reorganization resulting from partitioning. In another embodiment, a plurality of ranges of prime numbers are provided, each range being arranged for assignment to different types of nodes.

In a further embodiment, the prime number and node identifier pairs are stored in a global table to avoid the need for new nodes to access the LUTs of existing nodes and for individual nodes to manage their respective LUTs. In another embodiment, a mathematics library function is used so as to keep the generated prime numbers within a predetermined limit such as 64 bits.

In a further embodiment, instead of each node running a cluster management program, a central cluster management program is provided, run by one of the nodes or a dedicated node. This central cluster management program provides the cluster management functions to each node in the cluster, holds a central LUT and carries out the calculations to select the active partition when partitioning occurs.

As will be understood by those skilled in the art, the cluster nodes may be provided by virtual nodes or machines. Furthermore, while the above embodiments refer to high availability clusters, the features of such clusters may be combined with other cluster services or functions such as parallel processing or load balancing.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method, comprising:
    assigning, to a first computer in a cluster of computers via a cluster management program executed by the first computer, a first unique prime number relative to unique prime numbers assigned to other computers in the cluster of computers, where the computers in the cluster of computers manage their own active partition determination in response to partitioning of the cluster using the assigned unique prime numbers; and
    via the cluster management program executed by the first computer:
        detecting a partitioning event of the cluster into a plurality of partitions, each partition comprising at least one computer of the cluster;
        calculating a partition value, for each partition, from a product of the unique prime numbers assigned to each computer in each partition;
        determining, based upon the calculated partition value for each partition, an active partition, the active partition having a greatest partition value; and
        enabling the first computer to provide cluster services if the first computer is within the active partition; and
    where the first computer makes its own determination as to whether it is part of the active partition, and calculating partition values from the product of the unique prime numbers ensures that each partition value is unique and that only one partition is enabled as the active partition.

2. The method according to claim 1, further comprising storing, at the first computer, the unique prime numbers assigned to the other computers in the cluster.

3. The method according to claim 1, further comprising receiving, at the first computer, a second unique prime number for a new computer to the cluster, the second unique prime number being a lowest prime number not assigned to any other computer in the cluster.

4. The method according to claim 1, further comprising storing, at the first computer, a table of unique identifiers and the unique prime numbers associated with the other computers in the cluster.

5. The method according to claim 1, further comprising:
    disabling the first computer from providing the cluster services if the first computer is not within the active partition; and
    designating other computers not in the active partition as inactive computers.

6. The method according to claim 1, further comprising:
    calculating a number of computers in each partition, the active partition comprising a partition having a largest number of computers; and
    if more than one partition has the largest number of computers, then the active partition comprises a partition having the largest number of computers and having the greatest partition value.

7. The method according to claim 1, where assigning, to the first computer in the cluster of computers via the cluster management program executed by the first computer, the first unique prime number relative to the unique prime numbers assigned to the other computers in the cluster of computers comprises:
    providing a first and a second range of unique prime numbers, the second range being greater than the first range, the first unique prime number being assigned in the second range to increase a probability of the first computer being in the active partition.

8. The method according to claim 1, in which a number of bits used to represent the first unique prime number is moderated within a predetermined limit.

9. An apparatus, comprising:
    an interface to a cluster interconnect for interconnecting a first computer to a cluster of computers; and
    a processor of the first computer coupled to the interface to the cluster interconnect and programmed to execute a cluster management program, where the processor is programmed to:
        assign to the first computer in the cluster of computers a first unique prime number relative to unique prime numbers assigned to other computers in the cluster of computers, where the computers in the cluster of computers manage their own active partition determination in response to partitioning of the cluster using the assigned unique prime numbers;
        detect a partitioning event of the cluster into a plurality of partitions, each partition comprising at least one computer of the cluster;
        calculate a partition value, for each partition, from a product of the unique prime numbers assigned to each computer in each partition;
        determine, based upon the calculated partition value for each partition, an active partition, the active partition having a greatest partition value; and enable the first computer to provide cluster services if the first computer is within the active partition; and where the first computer makes its own determination as to whether it is part of the active partition, and calculating partition values from the product of the unique prime numbers ensures that each partition value is unique and that only one partition is enabled as the active partition.

10. The apparatus according to claim 9, where the processor is further programmed to store the unique prime numbers assigned to the other computers in the cluster.

11. The apparatus according to claim 9, where the processor is further programmed to receive a second unique prime number for a new computer to the cluster, the second unique prime number being a lowest prime number not assigned to any other computer in the cluster.

12. The apparatus according to claim 9, where the processor is further programmed to store a table of unique identifiers and the unique prime numbers associated with the other computers in the cluster.

13. The apparatus according to claim 9, where the processor is further programmed to:
disable the first computer from providing the cluster services if the first computer is not within the active partition; and
designate other computers not in the active partition as inactive computers.

14. The apparatus according to claim 9, where the processor is further programmed to:
calculate a number of computers in each partition, the active partition comprising a partition having a largest number of computers; and
if more than one partition has the largest number of computers, then the active partition comprises a partition having the largest number of computers and having the greatest partition value.

15. The apparatus according to claim 9, where the processor, in being programmed to assign to the first computer in the cluster of computers the first unique prime number relative to the unique prime numbers assigned to the other computers in the cluster of computers, is programmed to provide a first and a second range of unique prime numbers, the second range being greater than the first range, the first unique prime number being assigned in the second range to increase a probability of the first computer being in the active partition.

16. A computer program product comprising a computer readable storage device having computer readable program code tangibly embodied therewith, where the computer readable program code when executed on a computer causes the computer to:
assign, to the computer in a cluster of computers, a first unique prime number relative to unique prime numbers assigned to other computers in the cluster of computers, where the computers in the cluster of computers manage their own active partition determination in response to partitioning of the cluster using the assigned unique prime numbers;
detect a partitioning event of the cluster into a plurality of partitions, each partition comprising at least one computer of the cluster;
calculate a partition value, for each partition, from a product of the unique prime numbers assigned to each computer in each partition;
determine based upon the calculated partition value for each partition, an active partition, the active partition having a greatest partition value; and
enable the computer to provide cluster services if the computer is within the active partition; and
where the computer makes its own determination as to whether it is part of the active partition, and calculating partition values from the product of the unique prime numbers ensures that each partition value is unique and that only one partition is enabled as the active partition.

17. The computer program product of claim 16, further comprising computer readable program code configured to store, at the computer, a table of unique identifiers and the unique prime numbers associated with the other computers in the cluster.

18. The computer program product of claim 16, where the computer readable program code configured to assign, to the computer in the cluster of computers, the first unique prime number relative to the unique prime numbers assigned to the other computers in the cluster of computers comprises computer readable program code configured to provide a first and a second range of unique prime numbers, the second range being greater than the first range, the first unique prime number being assigned in the second range to increase a probability of the computer being in the active partition.

* * * * *